United States Patent
Geltinger et al.

(10) Patent No.: US 12,459,188 B2
(45) Date of Patent: Nov. 4, 2025

(54) APPARATUS AND METHOD FOR FORMING PLASTIC PREFORMS INTO PLASTIC CONTAINERS

(71) Applicant: KRONES AG, Neutraubling (DE)

(72) Inventors: Florian Geltinger, Donaustauf (DE); Norbert Kindl, Tegernheim (DE); Martin Schlagenhaufer, Regensburg (DE)

(73) Assignee: KRONES AG, Neutraubling (DE)

( * ) Notice: Subject to any disclaimer, the term of this patent is extended or adjusted under 35 U.S.C. 154(b) by 108 days.

(21) Appl. No.: 18/222,913

(22) Filed: Jul. 17, 2023

(65) Prior Publication Data

US 2024/0017467 A1 Jan. 18, 2024

(30) Foreign Application Priority Data

Jul. 15, 2022 (DE) ...................... 10 2022 117 720.3

(51) Int. Cl.
*B29C 49/28* (2006.01)
*B29C 49/36* (2006.01)
(Continued)

(52) U.S. Cl.
CPC .............. *B29C 49/36* (2013.01); *B29C 49/28* (2013.01); *B29C 2049/4697* (2013.01);
(Continued)

(58) Field of Classification Search
CPC . B29C 49/36; B29C 49/28; B29C 2049/4697; B29C 2049/4856; B29C 2049/4892
See application file for complete search history.

(56) References Cited

U.S. PATENT DOCUMENTS

| 8,591,215 B2 * | 11/2013 | Duclos | ................. | B29C 33/305 |
| | | | | 425/150 |
| 10,363,698 B2 | 7/2019 | Diesnis | ................. | B29C 49/46 |

(Continued)

FOREIGN PATENT DOCUMENTS

| DE | 10027111 | 12/2011 | ............. | B29C 49/56 |
| DE | 102012108329 | 5/2014 | ............... | B67C 3/24 |

(Continued)

OTHER PUBLICATIONS

Search Report issued in German Patent Appln. Serial No. 10 2022 117 720.3, dated Dec. 14, 2022, with machine translation, 8 pages.

(Continued)

*Primary Examiner* — Thu Khanh T. Nguyen
(74) *Attorney, Agent, or Firm* — HAYES SOLOWAY P.C.

(57) ABSTRACT

An apparatus for forming plastic preforms into plastic containers, having a transport device which transports the plastic preforms along a predetermined transport path. The transport device has a movable and in particular rotatable transport carrier on which a plurality of forming stations is arranged. The forming stations each having blow molding devices with at least two blow mold side parts and a bottom part which form a hollow space inside which the plastic preforms are formed into the plastic containers by applying a flowable medium. The forming stations each having application devices for applying the flowable medium to the plastic preforms. A diameter of the transport carrier is smaller than 2 m, and 4-16 forming stations are arranged on the transport carrier or a diameter of the transport carrier is smaller than 3 m, and 17 to 35 forming stations are arranged on the transport carrier.

7 Claims, 1 Drawing Sheet

(51) Int. Cl.
    *B29C 49/46*     (2006.01)
    *B29C 49/48*     (2006.01)
    *B29L 31/00*     (2006.01)

(52) U.S. Cl.
    CPC ............ *B29C 2049/4856* (2013.01); *B29C 2049/4892* (2013.01); *B29L 2031/712* (2013.01)

(56) References Cited

U.S. PATENT DOCUMENTS

| | | | |
|---|---|---|---|
| 2004/0104517 A1 | 6/2004 | Kronseder | 264/523 |
| 2013/0064920 A1* | 3/2013 | Geltinger | B29C 33/306 |
| | | | 425/522 |
| 2015/0072036 A1 | 3/2015 | Winzinger et al. | 425/88 |
| 2015/0225098 A1 | 8/2015 | Soellner et al. | B65B 31/025 |
| 2018/0250869 A1 | 9/2018 | Hack et al. | B29C 49/46 |
| 2019/0022917 A1* | 1/2019 | Santais | B29C 49/36 |
| 2021/0122099 A1 | 4/2021 | Soellner et al. | B29C 46/46 |

FOREIGN PATENT DOCUMENTS

| | | | | |
|---|---|---|---|---|
| DE | 102014018144 | 8/2015 | ............ | B29C 49/42 |
| DE | 102015122310 | 6/2017 | ............ | B29C 49/42 |
| FR | 2963752 A1 * | 2/2012 | ............ | B29C 49/56 |

OTHER PUBLICATIONS

Search Report issued in European Patent Appln. Serial No. 23165031.8, dated Nov. 29, 2023, with machine translation, 9 pages.

* cited by examiner

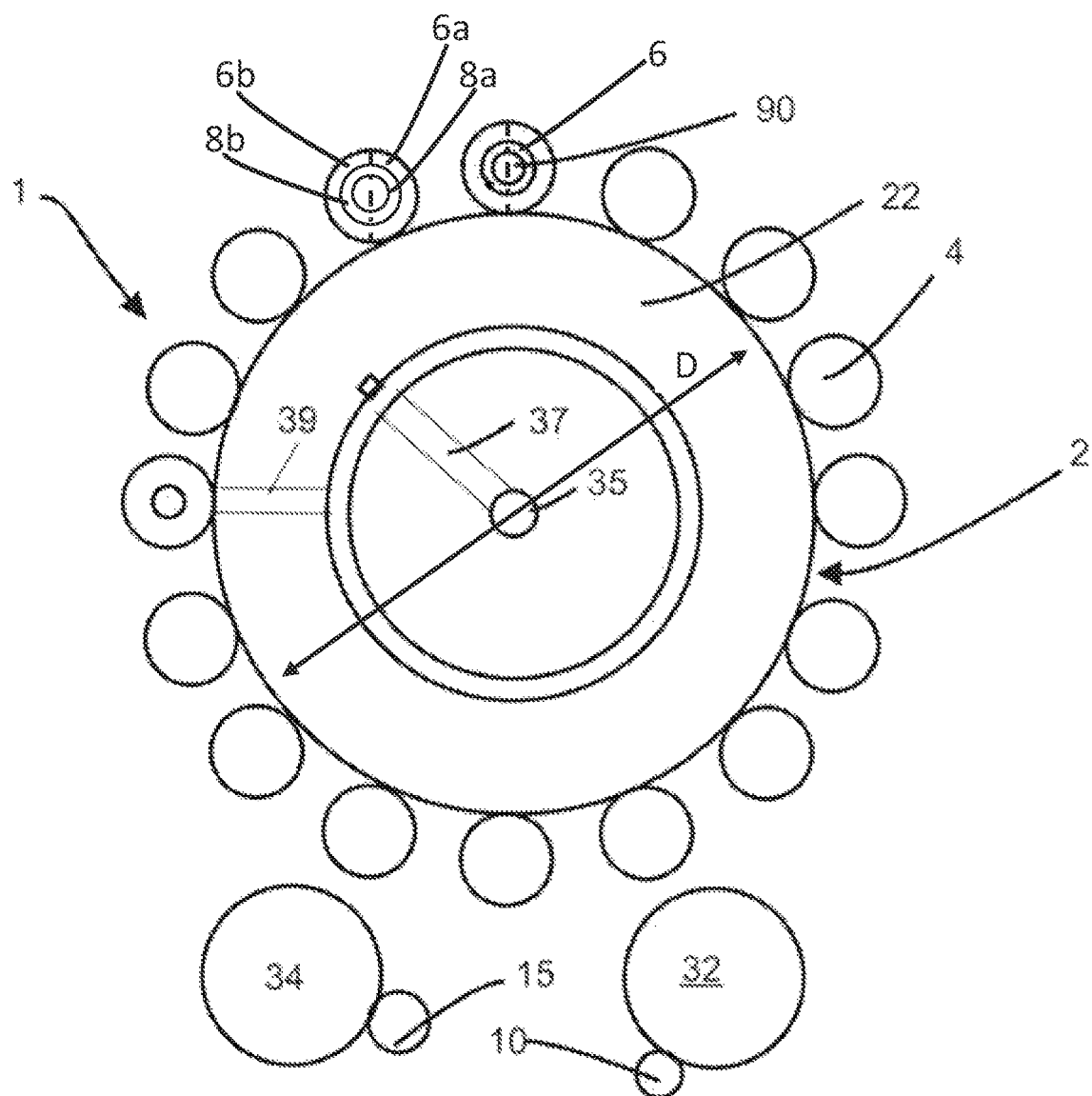

APPARATUS AND METHOD FOR FORMING PLASTIC PREFORMS INTO PLASTIC CONTAINERS

BACKGROUND OF THE INVENTION

The present invention relates to an apparatus and a method for forming plastic preforms into plastic containers. Such apparatuses and methods have long been known from the prior art. The plastic preforms are usually formed into the plastic containers within a forming station and more precisely within a blow molding device by applying a flowable medium. The blow molding devices usually have two blow mold side parts and a bottom part, which together form a hollow space which corresponds to a negative contour of the finished plastic container. In recent times, apparatuses and methods have also become known with which the formation of the plastic preforms into the plastic containers takes place within a cleanroom. In this way, it is possible, for example for the entire forming process to be carried out under sterile conditions, and the manufactured plastic containers therefore do not have to be sterilized again or only with less effort. So-called blow molding machines are also known from the prior art which, during the blowing process, also stretch the plastic preforms in their longitudinal direction. These are in particular so-called stretch blow molding machines.

A plurality of forming stations is arranged on a movable and in particular rotatable transport carrier. The (pitch circle) diameter of the transport carrier is very large in relation to the number of forming stations arranged on the transport carrier. For example, it is known from the internal prior art of the applicant that only 12-16 forming stations are arranged on a transport carrier with a diameter of 2.3 m, and 20-24 forming stations when the diameter is 3.4 m.

Therefore, in the internal prior art of the applicant, a very large amount of space is required for a comparatively small number of forming stations, which leads to a large system footprint and increased costs. If the transport carrier is arranged within a cleanroom, it must also be designed correspondingly large and be kept sterile with a large quantity of, for example, $H_2O_2$.

It is therefore an object of the present invention to reduce the footprint of a system for forming plastic preforms into plastic containers in order to achieve savings in cost and space.

SUMMARY OF THE INVENTION

The invention is therefore directed to an apparatus for forming plastic preforms into plastic containers, having a transport device which transports the plastic preforms to be formed along a predetermined transport path, wherein the transport device has a movable and, in particular, rotatable transport carrier on which a plurality of forming stations are arranged, wherein these forming stations each have blow-molding devices with at least two blow-molding side parts and a bottom part, which form a hollow space inside which the plastic preforms can be formed into the plastic containers by applying a flowable medium, and the forming stations each have application devices for applying a flowable medium to the plastic preforms, and the apparatus has a cleanroom which is bounded by a plurality of walls and inside which the plastic preforms are expanded into the plastic containers.

According to the invention, a diameter of the transport carrier is smaller than 2 m, and 4 to 16 forming stations are arranged on the transport carrier, or a diameter of the transport carrier is smaller than 3 m, and 17 to 35 forming stations are arranged on the transport carrier. Particularly preferably, between 4-16 forming stations are arranged on a transport carrier having a diameter of greater than or equal to 0.5 m and less than or equal to 2 m, and/or between 17-35 forming stations are arranged on a transport carrier having a diameter of greater than or equal to 2.1 m and less than or equal to 3 m.

Accordingly, it is proposed according to the invention to increase the number of forming stations on a transport carrier, or to arrange several forming stations on a smaller transport carrier than before. Compared to the blow molding machines known in the prior art of the applicant, this leads to a smaller footprint or space requirement of the system and related savings in cost.

The apparatus for forming plastic preforms into plastic containers is preferably a blow molding machine. In an advantageous embodiment, a plurality of blow molding devices is arranged on a common movable transport carrier. This carrier is in particular a rotatable carrier and in particular a blowing wheel.

The blow molding devices are preferably formed in multiple parts and have two blow mold halves and a bottom mold. These blow mold halves are preferably detachably arranged on a mold carrier shell or on the blow mold carriers. The blow mold carriers are pivotable relative to one another in order to open and close the blow molding devices. In addition, the blow mold carrier has locking mechanisms in order to lock the mold halves against each other during the blowing process.

Advantageously, a plurality of such blow molding devices is arranged within a blow molding machine and particularly preferably within a stretch blow molding machine. This means that the plastic preforms are expanded into the plastic containers by applying compressed air. For this purpose, the apparatus preferably has a blowing nozzle which can be applied to an opening of the plastic preforms in order to apply blowing air to the plastic preforms and expand them by means of blowing air. Alternatively, it is also conceivable for the blowing nozzle to be applied in a sealing manner to the supporting ring and/or the blow mold. In addition, a valve arrangement is preferably also provided which controls the supply of the blowing air to the plastic preforms.

In a further advantageous embodiment, the blow molding devices or the forming stations each have stretching rods which stretch the plastic preforms in their longitudinal direction. Particularly preferably, the blow molding machine or the carrier and the blow mold arrangements are arranged within a cleanroom which delimits the blow molding machine from an unsterile environment. Drive devices for closing, locking and/or opening the blow molds are preferably arranged outside the cleanroom.

The blow molding devices are preferably transported within the cleanroom, wherein the cleanroom is preferably bounded by several walls. Preferably, the cleanroom is bounded by at least one standing wall and a wall moving relative to this standing wall. In this case, for example, the transport carrier on which the blow molding devices are arranged can already have or form one of these walls, and in particular the moving wall. The cleanroom separates the blow molding devices in particular from a non-sterile environment.

In a further preferred method, parts of the blow molding device are tempered. In particular, parts of the blow molding device are heated. This heating is preferably carried out by means of electrical energy or by means of a flowable and in particular liquid temperature control medium. For example, hot oil or water can be used to temper the side parts of the blow mold and/or the bottom part of the blow mold. This tempering can be carried out by means of channels which are arranged in the blow mold itself, and/or also by means of channels which are arranged in blow mold shells and/or also in a blow mold carrier.

The individual forming stations arranged on the transport carrier preferably each have a distance between 0.05 m and 1 m, preferably between 0.06 m and 0.8 m, and particularly preferably between 0.07 m and 0.5 m relative to one another. Particularly preferably, the individual forming stations have a distance between 0.08 m and 0.6 m, preferably between 0.1 m and 0.5 m, from each other when the diameter of the transport carrier is less than 2 m, or a distance between 0.05 m and 0.2 m, preferably 0.07 m and 0.18 m, from each other when the diameter of the transport carrier is less than 3 m. The exact distance of the forming stations from one another is dependent on the exact diameter of the transport carrier and the number of forming stations. For example, the distance between the individual forming stations in a transport carrier having a diameter of 1.7 m and 14 forming stations is approximately 0.12 m, and a transport carrier having a diameter of 2.3 m and 22 forming stations is approximately 0.1 m.

In a preferred embodiment, the blow mold side parts are each arranged on a first mold carrier and a second mold carrier, which are movable relative to a pivot axis for opening and/or closing. The blow mold side parts are preferably replaceable and arranged on the mold carriers. Preferably, the bottom part is also arranged, in particular replaceably, on a bottom part support.

In a further preferred embodiment, an opening and/or closing movement of the first mold carrier is by a first angle, and an opening and/or closing movement of the second mold carrier is by a second angle, wherein the first angle and the second angle are substantially identical.

Accordingly, the two mold carriers preferably carry out an identical movement. The two mold carriers are accordingly preferably designed or arranged to be movable. This is particularly advantageous because less space is required for the opening movement as a result. The opening and/or closing movement of the mold carriers therefore also helps to make it possible for the forming stations to be arrangeable closer to one another, and therefore for the diameter of the transport carrier to be reducible.

Preferably, the mold carriers are arranged or mounted on a stationary pivot axis or pivot shaft and can be moved relative thereto. The pivot axis preferably connects both mold carriers (mechanically) to one another. Advantageously, both mold carriers rotate relative to a stationary bearing axis of the pivot axis by basically the same angle. Bearing elements in the form of sealed rolling bearings or plain bearings are preferably arranged between the bearing axis and the mold carriers.

Particularly preferably, the opening and closing movement of the mold carriers is mirrored about a geometric axis of symmetry. The opening and closing movement of the mold carriers is preferably a pivoting movement and in particular a pivoting movement by a predetermined angle.

The movement of the mold carriers is preferably controlled via at least one guide curve. The opening of the mold carriers preferably serves in particular for inserting a plastic preform into the blow molding device and, after forming, for allowing a formed plastic container to be removed from the blow molding device. It is also necessary to open the mold carriers to replace the blow mold parts, such as the blow mold side parts and the bottom part. The mold carriers are therefore preferably opened and closed within certain or predetermined angular ranges of the transport carrier.

In this context, the fact that the opening and/or closing movement of the first mold carrier by a first angle and the opening and/or closing movement of the second mold carrier by a second angle are substantially identical means that the opening and/or closing movement of the first mold carrier by the first angle and the opening and/or closing movement of the second mold carrier by the second angle do not deviate from one another by more than 3°-10°, preferably by no more than 2°-7°, and particularly preferably by no more than 1°-5°. The opening angle between the two mold carriers is preferably between 0 and 150 degrees.

In a preferred embodiment, the apparatus has a sealing device in order to seal the cleanroom from an unsterile environment. In particular, this sealing device prevents non-sterile ambient air and germs from entering the cleanroom and contaminating it.

In a further preferred embodiment, the sealing device has at least one circumferential channel which can be filled with a liquid and into which a circumferential wall projects, wherein this wall is preferably at least one blade and particularly preferably exactly one blade. It is accordingly proposed to use a so-called water lock for sealing the cleanroom, and in particular a single water lock, which has exactly one blade, which dips into the flowable medium and therefore separates a non-sterile region from the sterile region. By using a single water lock, in contrast to a double water lock, a smaller footprint of the installation can also be made possible, since this requires less space.

The circumferential wall of the sealing device is preferably designed to be rotatable with respect to the channel. Preferably, the rotational movement of this wall is coupled to the rotational movement of the transport carrier. This wall is therefore preferably a circulating blade which forms a component of the water lock or the hydraulic seal. Particularly preferably, this wall dips into the liquid located in the channel. Conversely, it would also be conceivable for the channel to be rotatable and the circumferential wall to be designed stationary.

The circumferential channel is preferably divided by the circumferential wall of the sealing device into a radially inner channel section and a radially outer channel section, wherein the blade preferably dips into the liquid in a region between the inner channel section and the outer channel section.

In a preferred embodiment, a forming station has a station output between 2,500 and 2,800 plastic containers per hour. In other words, between 2,500 and 2,800 plastic containers per hour can be formed with a forming station.

In a further preferred embodiment, the apparatus has a system output of about between 10,000 and 85,000 plastic containers per hour. The system output is in particular dependent on the number of forming stations of the apparatus.

The present invention is also directed to an apparatus for forming plastic preforms into plastic containers, having a transport device which transports the plastic preforms to be formed along a predetermined transport path, wherein the transport device has a movable and, in particular, rotatable transport carrier on which a plurality of forming stations are arranged, wherein these forming stations each have blow-molding devices with at least two blow-molding side parts and a bottom part, which form a hollow space inside which the plastic preforms can be formed into the plastic containers by applying a flowable medium, and the forming stations each have application devices for applying a flowable medium to the plastic preforms. Furthermore, the apparatus has a cleanroom which is bounded by several walls and within which the plastic preforms are expanded to form the plastic containers.

According to the invention, a ratio between a diameter of the transport carrier and a number of the forming stations is less than 0.14, preferably less than 0.13 and particularly preferably less than 0.12. These ratios are advantageous because they allow an optimum ratio between the number of forming stations and the size of the transport carrier in order to select them as small as possible and therefore reduce the required space. By maintaining these ratios, several stations can therefore be arranged on a smaller platform or a smaller transport carrier.

A ratio between a diameter of the transport carrier and a number of forming stations is preferably greater than 0.35, preferably greater than 0.2. Particularly preferred a ratio between a diameter of the transport carrier and a number of the forming stations is less than 0.14, or greater than 0.2.

The present invention is further directed to a method for operating an apparatus for forming plastic preforms into plastic containers, having a transport device which transports the plastic preforms to be formed along a predetermined transport path, wherein the transport device has a movable and, in particular, rotatable transport carrier on which a plurality of forming stations are arranged, wherein these forming stations each have blow-molding devices with at least two blow-molding side parts and a bottom part, which form a hollow space inside which the plastic preforms are formed into the plastic containers by applying a flowable medium, and the forming stations each have application devices which apply the flowable medium to the plastic preforms, and a cleanroom is provided which is bounded by several walls and inside which the plastic preforms are expanded into the plastic containers.

According to the invention, a diameter of the transport carrier is smaller than 2 m, and 4 to 16 forming stations are arranged on the transport carrier, or a diameter of the transport carrier is smaller than 3 m, and 17 to 35 forming stations are arranged on the transport carrier.

In this case, the above-described apparatus is in particular designed and provided to carry out this described method, i.e. all listed features of the above-described apparatus are also disclosed for the method described here and vice versa.

Further advantages and embodiments emerge from the accompanying drawing.

BRIEF DESCRIPTION OF THE DRAWING

In the drawings:
FIG. 1 shows a schematic representation of an apparatus according to the invention.

DETAILED DESCRIPTION OF THE INVENTION

FIG. 1 shows a schematic representation of an apparatus 1 according to the invention. The apparatus 1 has a supply device 32, such as in particular a transport starwheel or a transport wheel 32, which supplies plastic preforms 10 to the apparatus. The reference sign 34 designates a discharge device, in particular a transport starwheel, which removes the manufactured plastic containers 15 from the apparatus 1.

The apparatus has a transport device 2 with a rotatable transport carrier 22 on which a plurality of forming stations 4 is arranged. The reference sign D designates the diameter of the transport carrier 22. The forming station 4 in each case has a blow molding device 6, as well as stretching rods 90 which can be inserted into the plastic preforms in order to stretch them in their longitudinal direction. The blow molding device 6 has two blow mold side parts 6a, 6b, which are each arranged on a first mold carrier 8a and a second mold carrier 8b.

The reference sign 35 designates a rotary distributor by means of which compressed air can be supplied to the individual forming station. The reference sign 37 designates a connecting line which applies compressed air to a first pressure reservoir. The forming stations 4 can be supplied with the compressed air and in particular also different pressure levels via individual connecting lines 39 (only one shown).

The applicant reserves the right to claim all features disclosed in the application documents as essential to the invention, provided that they are novel over the prior art individually or in combination. It is also pointed out that features which can be advantageous in themselves are also described in the individual FIGURES. The person skilled in the art will immediately recognize that a particular feature described in a FIGURE can be advantageous even without the adoption of further features from this FIGURE. Furthermore, the person skilled in the art will recognize that advantages can also result from a combination of several features shown in individual or in different FIGURES.

LIST OF REFERENCE SIGNS

1 apparatus
2 transport device
4 forming stations
6 blow molding device
6a, 6b blow mold side parts
8a first mold carrier
8b second mold carrier
10 plastic preforms
15 plastic containers
22 transport carrier
32 supply device
34 discharge device
35 rotary distributor
37 connecting line
39 individual connecting lines
90 stretching rods
D diameter of the transport carrier 22

The invention claimed is:
1. An apparatus for forming plastic preforms into plastic containers, having a transport device which is configured to transport the plastic preforms to be formed along a predetermined transport path, wherein the transport device has a movable transport carrier on which a plurality of forming stations are arranged, wherein these forming stations each have blow-molding devices with at least two blow-molding side parts and a bottom part, which form a hollow space inside which the plastic preforms can be formed into the plastic containers by applying a flowable medium, and the forming stations each have application devices configured for applying a flowable medium to the plastic preforms, and the apparatus has a cleanroom which is bounded by several walls and inside which the plastic preforms are expanded into the plastic containers,
wherein
a diameter of the transport carrier is less than 2 m, and 4-16 forming stations are arranged on the transport carrier, or a diameter of the transport carrier is less than 3 m and 17-35 forming stations are arranged on the transport carrier, and
wherein
the individual forming stations arranged on the transport carrier each have a distance between 0.06 m and 0.8 m relative to one another, and
the blow mold side parts are each arranged on a first mold carrier and a second mold carrier which are movable relative to a pivot axis for opening and/or closing and an opening and/or closing movement of the first mold carrier is carried out by a first angle, and an opening and/or closing movement of the second mold carrier is carried out by a second angle, wherein the first angle and the second angle are identical, whereupon the first mold carrier and the second mold carrier are configured to carry out identical movements.

2. The apparatus according to claim 1,
wherein
the apparatus has a sealing device configured to seal the cleanroom from an unsterile environment.

3. The apparatus according to claim 2,
wherein
the sealing device has at least one circumferential channel which can be filled with a liquid and into which a circumferential wall projects.

4. The apparatus according to claim 1,
wherein
the forming station has a station output between 2,500 and 2,800 plastic containers per hour.

5. The apparatus according to claim 1,
wherein
the apparatus has a system output between 10,000 and 85,000 plastic containers per hour.

6. A method for operating an apparatus for forming plastic preforms into plastic containers, having a transport device which is configured to transport the plastic preforms to be formed along a predetermined transport path, wherein the transport device has a movable transport carrier on which a plurality of forming stations are arranged, wherein these forming stations each have blow-molding devices with at least two blow-molding side parts and a bottom part, which form a hollow space inside which the plastic preforms are formed into the plastic containers by applying a flowable medium, and the forming stations each have application devices which apply the flowable medium to the plastic preforms, and a cleanroom is provided which is bounded by several walls and inside which the plastic preforms are expanded into the plastic containers,
wherein
a diameter of the transport carrier is less than 2 m, and 4-16 forming stations are arranged on the transport carrier, or a diameter of the transport carrier is less than 3 m and 17-35 forming stations are arranged on the transport carrier, and
wherein
the individual forming stations arranged on the transport carrier each have a distance between 0.06 m and 0.8 m relative to one another, and
the blow mold side parts are each arranged on a first mold carrier and a second mold carrier which are movable relative to a pivot axis for opening and/or closing and an opening and/or closing movement of the first mold carrier is carried out by a first angle, and an opening and/or closing movement of the second mold carrier is carried out by a second angle, wherein the first angle and the second angle are identical, whereupon the first mold carrier and the second mold carrier are configured to carry out identical movements.

7. An apparatus for forming plastic preforms into plastic containers, having a transport device which is configured to transport the plastic preforms to be formed along a predetermined transport path, wherein the transport device has a movable transport carrier on which a plurality of forming stations are arranged, wherein these forming stations each have blow-molding devices with at least two blow-molding side parts and a bottom part, which form a hollow space inside which the plastic preforms are formed into the plastic containers by applying a flowable medium, and the forming stations each have application devices configured for applying a flowable medium to the plastic preforms, and the apparatus has a cleanroom which is bounded by several walls and inside which the plastic preforms are expanded into the plastic containers,
wherein
a ratio between a diameter of the transport carrier and a number of the forming stations is smaller than 0.14, and
wherein
the individual forming stations arranged on the transport carrier each have a distance between 0.06 m and 0.8 m relative to one another, and
the blow mold side parts are each arranged on a first mold carrier and a second mold carrier which are movable relative to a pivot axis for opening and/or closing and an opening and/or closing movement of the first mold carrier is carried out by a first angle, and an opening and/or closing movement of the second mold carrier is carried out by a second angle, wherein the first angle and the second angle are identical, whereupon the first mold carrier and the second mold carrier are configured to carry out identical movements.

* * * * *